April 23, 1968   J. H. HALSTEAD   3,379,412
CHAIN COLUMN MECHANISM
Filed Jan. 26, 1967   3 Sheets-Sheet 1
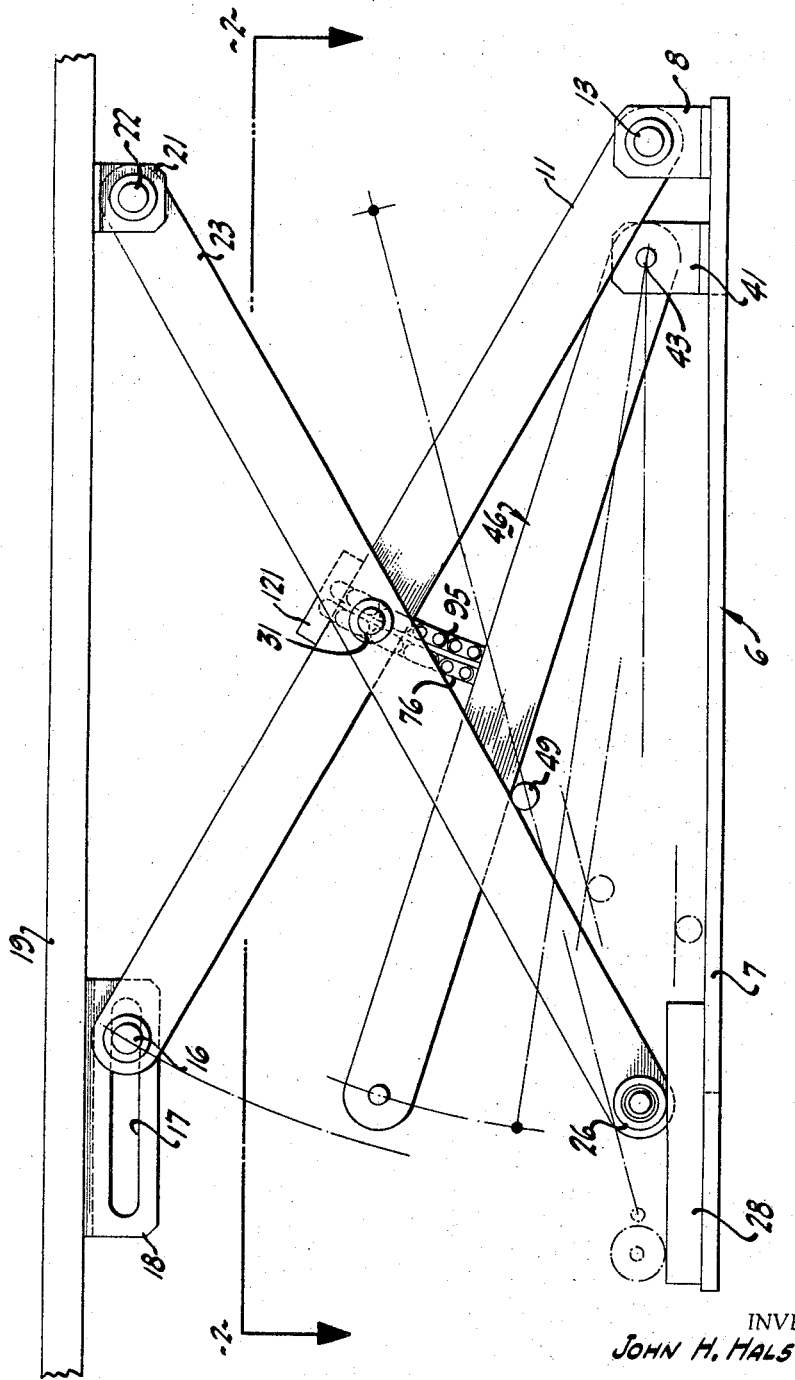
INVENTOR.
JOHN H. HALSTEAD
BY
Lothrop & West
ATTORNEYS

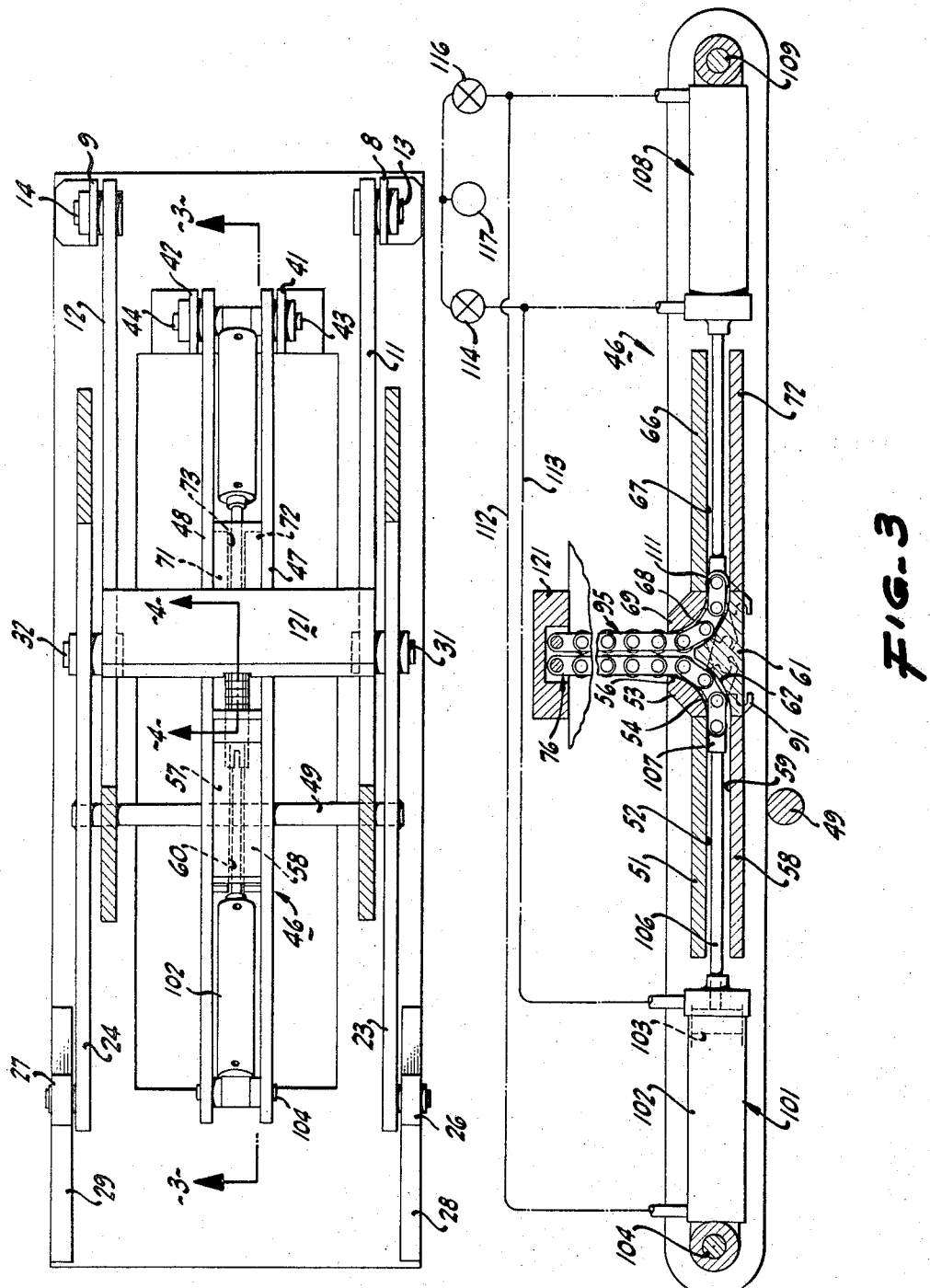

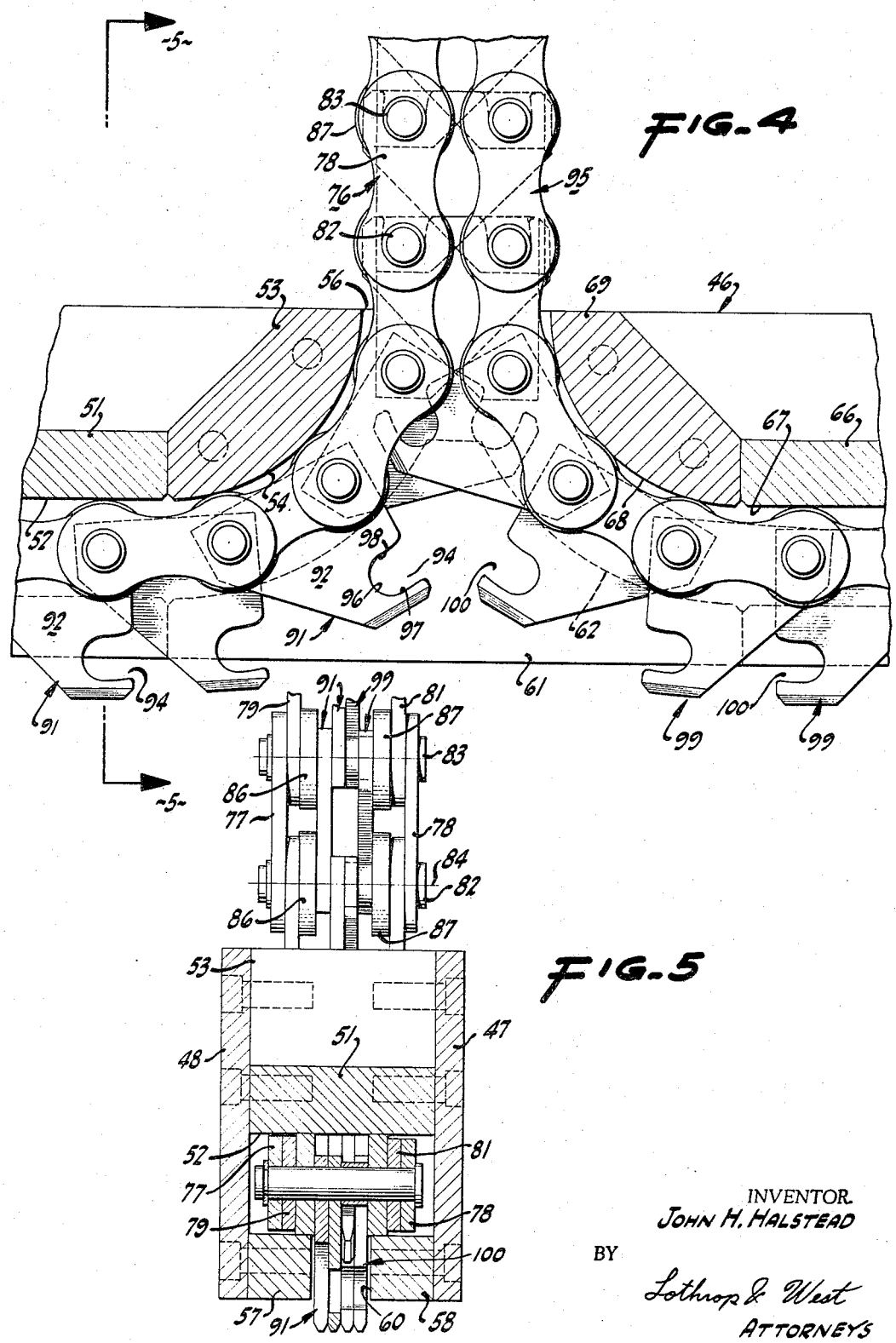

United States Patent Office 3,379,412
Patented Apr. 23, 1968

3,379,412
CHAIN COLUMN MECHANISM
John H. Halstead, 414 Seaview Drive,
Rio Del Mar, Calif.
Filed Jan. 26, 1967, Ser. No. 611,921
3 Claims. (Cl. 254—122)

ABSTRACT OF THE DISCLOSURE

Two separate, flexible link chains have hooks which interlock the chains together as they are forced through merging guides and form a rigid strut or column effective to raise a vehicle lift platform connected to a base by a scissors linkage.

My invention relates to mechanisms for exerting force in a direction to produce compression, or to strut mechanisms, particularly as they are involved in environments wherein space is at a premium and in which items are to be translated from one collapsed position to another erected position; for example, in connection with an auto lift.

Automobile lifts must be designed for use with various different vehicles so that an individual vehicle can be driven onto a station at which the lift is located without in any wise having the lift mechanism interfere with the positioning of the vehicle. Modern vehicles have many parts relatively close to the ground, so that the lift structure cannot project above the ground more than a very few inches. The lift structure when activated is required to lift the vehicle evenly and safely to an elevated position, usually several feet above the ground, and then to return the vehicle to its initial station for removal. Various mechanisms for use under these circumstances have been proposed and provided, but there is always a requirement for such a device which can be entirely located above the ground or floor and will be extremely compact when collapsed yet will operate effectively, safely and with appropriate force distribution.

It is therefore an object of the invention to provide a chain column mechanism which can readily move from a collapsed, compact position to an erected, supporting position.

Another object of the invention is to provide a chain column mechanism especially useful in connection with a vehicle lift which will exert force with appropriate advantage throughout the travel of the structure.

Another object of the invention is to provide a chain column mechanism which can readily be adapted to vehicle lifts of the sort presently available and can employ relatively standard force-exerting mechanisms.

Another object of the invention is to provide a chain column mechanism which in one position is relatively flexible and readily arranged in a desired space and in another position is relatively rigid to act as a column or strut.

Another object of the invention is to provide a chain column mechanism in which the various parts are easily and readily fabricated and interact well with only reasonable precision in manufacture.

A further object of the invention is to provide means for generally improving a chain column mechanism.

Other objects together with the foregoing are attained in the form of the invention disclosed in the accompanying description and illustrated in the accompanying drawings, in which:

FIGURE 1 is a side elevation of a chain column mechanism incorporated in a vehicle lift, the parts being shown in their erected or extended position;

FIGURE 2 is a cross section to a reduced scale, the plane of section being indicated by the line 2—2 of FIGURE 1;

FIGURE 3 is a cross section to an enlarged scale, the planes of section being indicated by the lines 33 of FIGURE 2;

FIGURE 4 is an enlarged cross section, the plane of which is indicated by the line 4—4 of FIGURE 2; and FIGURE 5 is an end elevation with portions in cross section, the plane of the view being indicated by the line 5—5 in FIGURE 4.

While the chain column mechanism can be employed in a number of different environments to act as an extensible column or strut, it has found practical application in an automobile lift for substantial vehicle lifting range but not requiring any excavation below the ground or floor.

In this embodiment there is provided a base 6 designed to rest on any suitable support such as a floor and made up of structural members such as metal plates and connectors. The structure is generally symmetrical about a vertical longitudinal plane, so that a description of one side of the device applies equally to the other. The base 6 includes a bottom plate 7 at one end having upright brackets 8 and 9, to each of which is pivoted one of a pair of first links 11 and 12. The pivotal connection is effectuated by aligned pivot pins 13 and 14. The links 11 and 12 at their far or free ends are interconnected by a cross tube 16 designed to engage slidably within slots 17 formed in flanges 18 depending from the nether side of a support 19 or platform mechanism. Any of the ordinary means (not shown) are provided to engage with the appropriate parts of a vehicle to be lifted.

The support 19 is likewise provided with a pair of depending brackets 21 having a cross rod 22 extending between them and forming a pivotal mount for a pair of second links 23 and 24. At their lower ends both links 23 and 24 carry pulley wheels 26 and 27 designed to roll on support pads 28 and 29 mounted on the base plate 7. The first links 11 and 12 and the second links 23 and 24 are restrained not only by the various rods and pins mentioned, but also by a central pair of pivots 31 and 32 in transverse alignment. This arrangement provides a scissors link mechanism so that the support 19 can be moved toward and away from the base plate 7 while always maintaining a substantially parallel relationship therewith.

The lift preferably also includes mechanism for the particular purpose of holding and propelling the lifting mechanism. Mounted on the base plate 7 is a pair of brackets 41 and 42 in transverse alignment near the brackets 8 and 9. Supported on the brackets 41 and 42 by pivot pins 43 and 44 is a frame 46, preferably including a pair of side members 47 and 48. The frame 46 is related to the remainder of the structure not only by the pivots 43 and 44 but also by resting upon a cross bar 49 secured to and spanning the space between the secondary links 23 and 24. The weight of the various members is such that normally all of the forces thereon are in a downward direction, so that the parts when collapsed under their own weight and the weight of a superimposed vehicle occupy a position very close to the floor and in a compact array. This relationship is fostered by having the various linkages disposed side by side in the collapsed position.

Particularly in accordance with the invention, I provide a chain column mechanism to move the structure from its lower, collapsed or compact position to its upper, extended or lifted position. For that reason, the side members 47 and 48 of the frame 46 are provided with a substantially symmetrical arrangement. A first chain guide member 51 comprised of a plate extends between the side members 47 and 48 and is secured thereto to provide a substantially planar or rectilinear lower surface 52.

Toward one end the first chain guide member 51 merges with a first terminal portion 53 made up of a block spanning the space between the side members 47 and 48. The block 53 has a curved lower surface 54, preferably the quadrant of a circle, arranged at one end to merge smoothly with the lower surface 52 of the first chain guide member 51 and also to terminate substantially coincident with a tangent plane extending approximately at right angles to the surface 52 in an up-and-down direction to define one side of a throat 56 or opening.

Situated beneath the first chain guide member 51 is a pair of first chain supports 57 and 58, each of which extends outwardly from one of the side members 47 and 48 and affords a surface 59 substantially parallel to the surface 52. The supports are spaced apart transversely in order to afford a channel 60 therebetween. The supports 57 and 58 conveniently merge with a center block 61 having a curved surface 62 complementary to the curved surface 54 and spanning the lower portion of the throat 56.

In a similar and symmetrical fashion, there is also provided on the frame 46 and between the side members 47 and 48 thereof a second chain guide member 66 having a lower surface 67 coplanar with the surface 52 and similarly merging with a curved surface 68 on a second terminal portion 69. This defines another side of the throat 56 in that it terminates substantially tangent to a plane normal to the surface 67. Beneath the second chain guide 66 are second chain supports 71 and 72 secured to the side members 47 and 48 parallel with the surface 67 and defining a channel 73 therebetween.

Disposed between the first chain guide member 51 and the first chain supports 57 and 58 is a first chain 76. This is of the usual sort comprising a succession of parallel side links 77 and 78 interspersed with similar side links 79 and 81. The successive links are interconnected by a series of pivot pins 82 and 83 appropriately fastened in place so that the chain as a whole is flexible about the transverse axes 84 of the pins, but is quite rigid in a lateral or transverse direction. Each of the pivot pins 82 and 83 carries a pair of antifriction rollers 86 and 87 free to turn on the pivot pins and having a diameter slightly larger than the maximum diameter of the chain links so that the rollers bear with running clearance on the surfaces of the guide formed by the members 51, 57 and 58.

In addition to connecting the links, the chain pins also carry a series of hook members. On the first chain 76 the pins carry a succession of first hooks 91 identical in construction. Each of them includes an approximately triangular plate 92 having substantially parallel side walls pierced to provide openings in the link to receive the pivot pins such as 82 and 83. The first hooks 91 are thus mounted on the chain so that each of the hooks is substantially rigid with regard to its own pair of chain links but can be rotated with them about the axis of either one of the pivot pins with respect to the adjacent links. The hooks can be formed integrally with the chain links themselves, but I have found in practice that it is economical to form the hooks as separate members and to mount them on successive pivot pins of the chains, as shown.

Each of the hooks 91 is formed so that in a location disposed on one side of the chain it is provided with a first notch 94. The notch is defined by a transversely extending wall defining a substantially semicircular portion 96 merging with side boundaries 97 and 98. These can in some instances be relatively straight and in other instances are preferably involutes similar to the surfaces of gear teeth. The first notches 94 on the first chain are open toward the guides for the second chain. Similarly, second hooks 99 on the second chain are faced so that their notches 100 open toward the guides for the first chain. Stated differently, the notches in the first chain and in the second chain face each other. The distance from each notch to its closest pivot pin on the same chain is sufficient so that the first chain and the second chain can be disposed side by side in close proximity. The pitch of the successive notches is substantially the same as that of the pins of the adjacent chain. In the illustrated case, each of the notches is substantially opposite or alongside one of the pivot pins such as 83. A plane extending through the axis of the arcuate portion 96 of the notch and the axis of the adjacent pivot pin 83, for example, is substantially normal to a plane extending through the axes of the two pivot pins 82 and 83.

Since each of the pivot pins carries a portion of at least two of the hooks 91, the successive hooks are laterally or axially staggered with respect to each other. Furthermore, the first hooks on the first chain are likewise transversely or axially staggered with respect to the second hooks on the second chain.

Means are provided for moving the chains with respect to their support surfaces and toward and away from each other. As particularly illustrated in FIGURES 2 and 3, one end of the frame 46 is provided with an extensible mechanism 101 which can be of any of several different sorts. An expansible chamber structure includes a cylinder 102 and a piston 103. The cylinder at one end is fastened on a cross member 104 extending between the side members 47 and 48. The piston 103 has a piston rod 106 terminating in a connection 107 to the end link of the first chain. Similarly, at the other end of the frame 46 an extensible mechanism 108 has a frame mounting 109 and a connection 111 to the end link of the second chain.

Corresponding ends of the extensible members 101 and 108 are joined by pipes 112 and 113 to control valves 114 and 116 having connection to a pressure fluid mechanism 117 also acting as a return for spent pressure fluid. Thus by appropriate control of the valves 114 and 116 (which may be embodied as a single valve), the mechanisms 101 and 108 can be simultaneously operated to cause the piston rods to move toward each other or away from each other. Hydraulic fluid or pneumatic fluid is normally for operating these structures. While the device can be operated with but one extensible mechanism, it is preferred to have two of them to get a better balance of forces and to keep the cylinder diameter smaller.

In addition to having one end of the first chain anchored to one piston rod and having the corresponding end of the second chain similarly anchored to the other piston rod, means are provided for securing the other ends of both the first chain and the second chain to a common member. The first chain and the second chain are connected to a block 121 included in the platform mechanism 19. This spans the space between and is firmly fastened to the first links 11 and 12. Thus the first chain and the second chain are prevented from moving longitudinally with respect to each other in the vicinity of the block 121.

When the platform structure is in its lower or compact position and the extensible mechanisms are in their retracted locations, operation of the appropriate valves 114 and 116 introduces pressure fluid to both extensible mechanisms and projects the piston rods therefrom. This movement causes the first chain and the second chain to translate toward each other along and between the guides and supporting plates, the hook plates travelling in the channels 60. As the chains move around the curved portions of the surfaces 54 and 68 toward each other, the first hooks on the first chain come into engagement with the pivot pins of the second chain, and the staggered, similar second hooks on the second chain come into interengagement with the first pivots of the first chain. Consequently, as the two chains emerge from the throat 56, they are interlocked or cross-hooked one with the other. The previous flexibility of each chain about its own pivot pins is eliminated and the two chains are hooked together and form a relatively rigid element stiff in all rectilinear directions, thus constituting a column or strut. It is true that the necessary mechanical clearances between the parts allow for some play, so that the combined chains are not absolutely rigid, but in fact can assume a very slight curvature about the axes of the pivot pins. The available curvature is not very great, so the total curvature of the chains is reduced by employing the linkage mechanism shown in FIGURE 1. The travel of the chain is about one-half of what it would ordinarily be were the frame 46 eliminated and the connected parts directly connected on the base. In any event, the combined chains are quite rigid and act in compression as a strut to bear the weight imposed upon the platform device.

By reversing the valves 114 and 116, the effect of the expansible mechanisms is reversed and the chains are moved apart from each other in the horizontal direction, the various links rounding the curved surfaces 54 and 68 and the hook notches of each chain separating from the pivot pins of the other chain in turn as the chains are moved apart. Ultimately when the chains have been completely lowered, the block 121 is substantially adjacent to the upper portion of the terminal portions 53 and 69, so that the compactness of the arrangement is restored.

What is claimed is:

1. A chain column mechanism comprising a table, a base, a first frame link pivoted at one end to said base and at the other end connected to said table, a second frame link pivoted at one end to said base crossing said first frame link and at the other end connected to said table, means for pivotally interconnecting said first frame link and said second frame link, a frame, means for relating said frame to said base, a first chain guide on said frame, a first terminal portion having a first curved surface at one end merging with said first chain guide and at the other end having a first tangent extending in a predetermined direction, a second chain guide on said frame, a second terminal portion having a second curved surface at one end merging with said second chain guide and at the other end having a second tangent substantially coplanar with and parallel to said first tangent, a first chain having a predetermined pitch and abutting said first chain guide and said first terminal portion, said first chain including a series of first links, first pivot pins connecting said first links and having their axes extending transversely parallel to said curved surfaces, first hooks including substantially triangular plates each secured to two successive pivot pins in said first chain and extending from said first chain and having transversely extending first notches of a size to engage with similar pivot pins and facing toward said second chain guide when said first chain abuts said first chain guide, said first notches being disposed in locations displaced from said first chain on the side away from said first chain guide and having substantially said predetermined pitch, a second chain having said predetermined pitch and abutting said second chain guide and said second terminal portion, said second chain including a series of second links, second pivot pins connecting said second links and having their axes extending transversely parallel to said curved surfaces, second hooks including substantially triangular plates each secured to two successive pivot pins in said second chain and extending from said second chain and having transversely extending second notches of a size to engage with similar pivot pins and facing toward said first chain guide when said second chain abuts said second chain guide, said second notches being disposed in locations displaced from said second chain on the side away from said first chain guide and having said predetermined pitch, said first hooks and said second hooks being transversely staggered with respect to each other, means for moving said first chain along said first chain guide and around said first curved surface and for moving said second chain along said second chain guide and around said second curved surface to bring said first hooks into engagement with said second pivot pins and said second hooks into engagement with said first pivot pins, and means for connecting said other end of said first chain and said second chain to said first frame link adjacent said interconnecting means.

2. A chain column mechanism as in claim 1 in which said moving means includes a first translating mechanism mounted on said frame and connected to one end of said first chain and includes a second translating mechanism mounted on said frame and connected to one end of said second chain.

3. A chain column mechanism as in claim 2 in which at least one of said translating mechanisms is a fluid expandable chamber.

References Cited

UNITED STATES PATENTS

| 1,834,900 | 1/1931 | Holmes | 254—89 |
| 2,375,462 | 5/1945 | Bender. | |
| 2,862,689 | 12/1958 | Dalrymple | 187—18 |
| 3,012,635 | 12/1961 | Blain | 187—19 |

FOREIGN PATENTS 898,832 7/1949 Germany.

EVON C. BLUNK, *Primary Examiner.*

RICHARD E. AEGERTER, *Examiner.*

H. C. HORNSBY, *Assistant Examiner.*